(12) United States Patent
Jakobsson et al.

(10) Patent No.: US 12,348,558 B2
(45) Date of Patent: Jul. 1, 2025

(54) SECURITY STATUS BASED ON HIDDEN INFORMATION

(71) Applicant: Lemon Inc., Grand Cayman (KY)

(72) Inventors: Markus Jakobsson, Culver City, CA (US); Hamed Ashouri, Culver City, CA (US); Shreshth Luthra, Los Angeles, CA (US); Hui Cao, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 325 days.

(21) Appl. No.: 17/443,469

(22) Filed: Jul. 27, 2021

(65) Prior Publication Data
US 2023/0041534 A1 Feb. 9, 2023

(51) Int. Cl.
*G06N 5/04* (2023.01)
*G06N 20/00* (2019.01)
*H04L 9/40* (2022.01)
*G06F 3/0484* (2022.01)
*G06N 5/045* (2023.01)
*G06N 5/046* (2023.01)

(52) U.S. Cl.
CPC .......... *H04L 63/1483* (2013.01); *G06N 5/04* (2013.01); *G06N 20/00* (2019.01); *G06F 3/0484* (2013.01)

(58) Field of Classification Search
None
See application file for complete search history.

(56) References Cited

U.S. PATENT DOCUMENTS

| 11,003,773 | B1* | 5/2021 | Fang | H04L 63/0263 |
| 11,720,668 | B2* | 8/2023 | Umesh | G06N 5/04 |
| | | | | 726/23 |
| 2022/0067146 | A1* | 3/2022 | Cai | G06F 21/566 |
| 2022/0147815 | A1* | 5/2022 | Conwell | G06N 20/20 |
| 2022/0217160 | A1* | 7/2022 | Morgan | G06F 16/951 |

OTHER PUBLICATIONS

A machine learning-based FinTech cyber threat attribution framework using high-level indicators of compromise. Noor. Elsevier. (Year: 2019).*
Behaviour-Based Attack Detection and Classification in Cyber Physical Systems Using Machine Learning. Junejo. IEEE. (Year: 2016).*

* cited by examiner

*Primary Examiner* — Venkat Perungavoor
(74) *Attorney, Agent, or Firm* — BakerHostetler

(57) ABSTRACT

Techniques for determining and presenting security status are described herein. The disclosed techniques include collecting information associated with an item; determining a security status associated with the item by classifying the item into one of a plurality of classifications based on the information associated with the item; presenting on a first interface information indicative of the security status, wherein the first interface further comprises at least one selectable interface element in relation to the information indicative of the security status; and performing an operation related to the item in response to receiving input indicative of a selection by a user of the at least one selectable interface element.

20 Claims, 10 Drawing Sheets

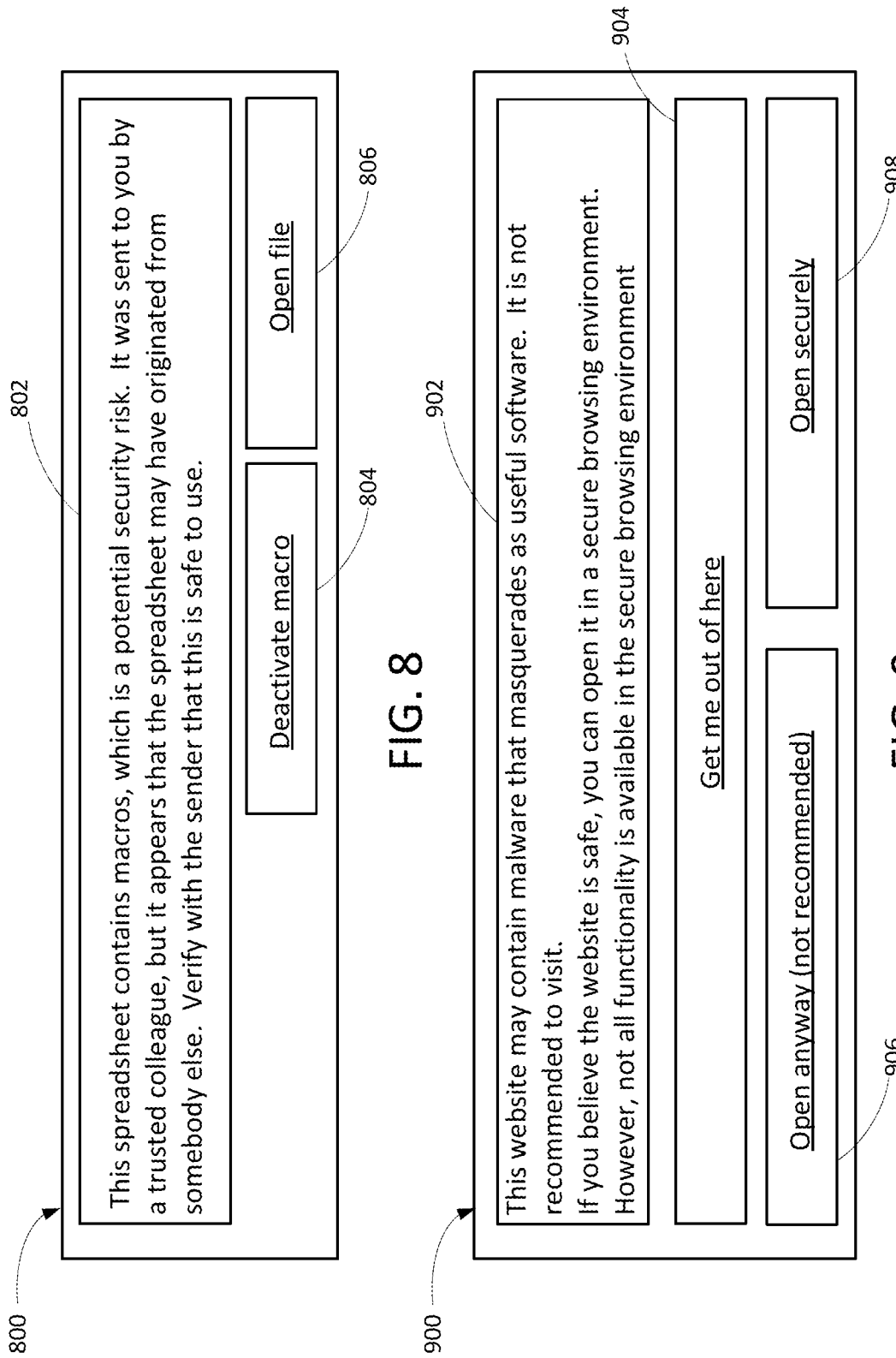

SECURITY STATUS BASED ON HIDDEN INFORMATION

BACKGROUND

Cyber security threats are growing in frequency, diversity, and complexity. While simple spammers and phishing malware are still real risks, the most damaging attacks often occur with well researched social engineering, targeted malware, precise impersonations, and specially constructed credential phishing sites. An attack may cause devastating results. This includes unauthorized purchases, stealing of funds, or identify theft for individual users. Depending on scope, an attack might escalate into a security incident from which a business will have a difficult time recovering. People continue to develop new tools or systems to safeguard against complex and growing cyber security threats.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 8 illustrates an example user interface 800 that is generated and presented in accordance with the present disclosure.

FIG. 9 illustrates an example user interface 900 that is generated and presented in accordance with the present disclosure.

DETAILED DESCRIPTION OF ILLUSTRATIVE EMBODIMENTS

Figure 1:
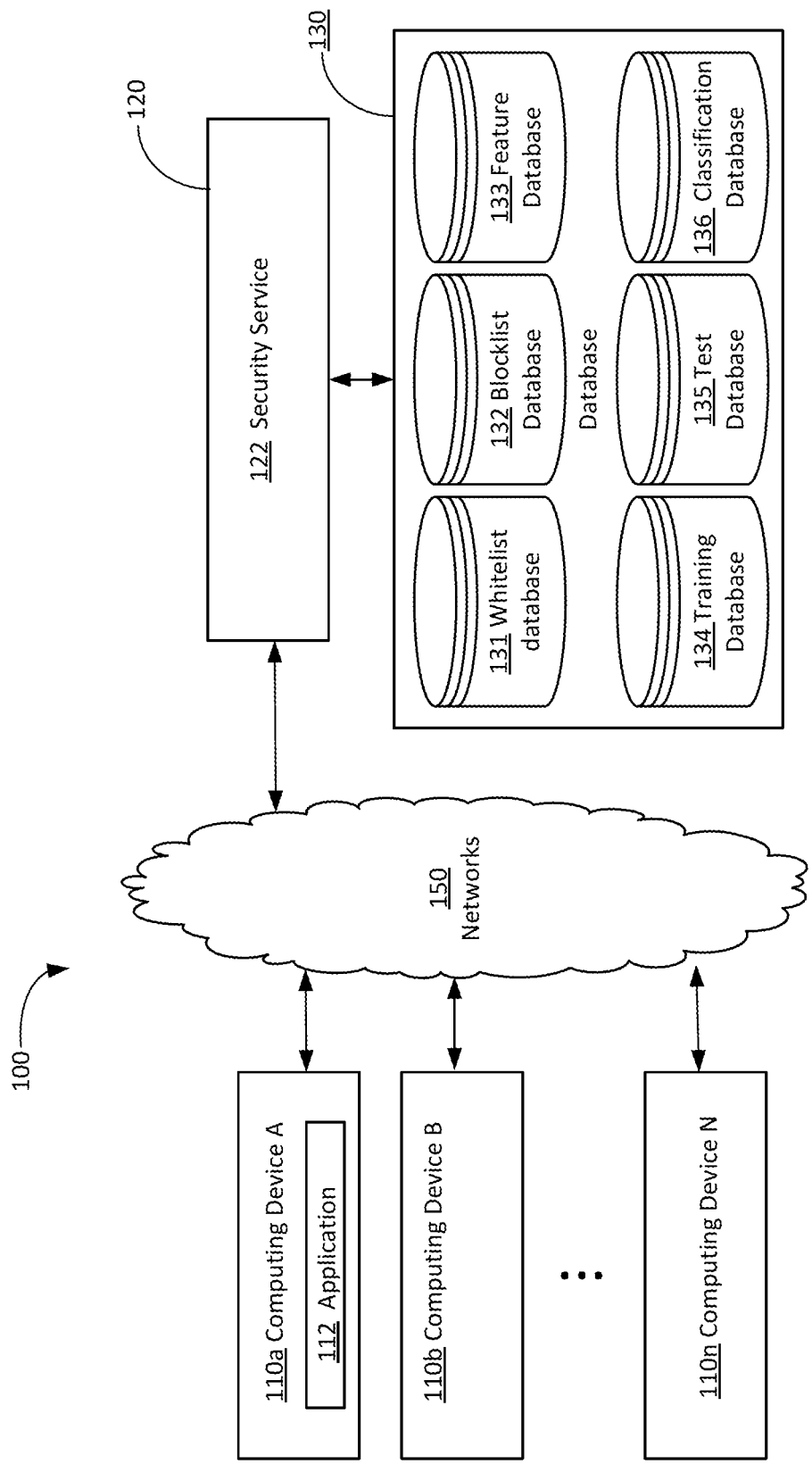
FIG. 1 is a schematic diagram illustrating an example system for use in accordance with the present disclosure.

FIG. 1 is a schematic diagram illustrating an example system 100. In some embodiments, the example system 100 may determine and present security status of items. The items may be a hyperlink, a website, an image, a text, an icon, an attachment, a stored application, a stored file, online documents, a link to a cloud-hosted resource, etc. As shown, the system 100 comprises a plurality of computing devices 110a..., and 110n (collectively, 110), at least one server 120, and one or more databases 130. The server 120 may be a cloud-based server. The server 120 may provide security service 122 for determining and presenting security status of items. The computing devices 110 may communicate with the server 120 via one or more networks 150. The server 120 as well as the computing devices may access and/or store data in the one or more databases 130.

It should be appreciated that the system 100 described in FIG. 1 is merely illustrative and that other implementations might be utilized. For instance, the computing devices 110, the server 120, or other computing devices may be used singly or in combination to implement a process of determining and presenting security status as described below in the present disclosure. Other implementations should be apparent to those skilled in the art. It should also be appreciated that network topology illustrated in FIG. 1 has been greatly simplified and that many more networks, devices, and databases may be utilized to interconnect the various computing systems disclosed herein.

The computing devices 110 may be any type of computing devices, e.g., personal computer, laptop computer, tablet computer, mobile telephone, smartphone, and so on. The computing devices 110 comprise memories for storing data. The computing devices 110 are configured to exchange data with the server 120 via the networks 150. The computing devices 110 are also configured to transmit data to and receive data from any other computing devices or services. For example, the computing devices 110 may receive emails, messages, images, documents, and other information from other devices or services. The computing device 110 may further comprises a security application 112 operating on the computing device 110. The security application 112 may perform operations for determining and presenting security status of items as described herein below.

The server 120 may host one or more applications configured to manage services. For example, the server 120 may be configured to validate the computing devices 110 before they are authorized to access stored data. The server 120 may maintain information related to a user account including account details and others. The server 120 may host one or more databases storing data that may be accessed by the computing devices 110. Also, the server 120 may host one or more applications configured to interact with applications installed on the computing devices 110. The server 120 is configured to communicate with the computing devices 110, the one or more databases 130, other servers and/or databases via the one or more networks 150.

In some embodiments, the server 120 is configured to monitor, collect, or generate data for determining and presenting security status of items. The server 120 and/or the computing devices 110 may store data into the one or more databases 130, such as a whitelist database 131, a blocklist database 132, a feature database 133, a training database 134, a test database 135, a classification database 136, and so on. By way of example and without limitation, the whitelist database 131 may store whitelists of items; the blocklist database 132 may store blocklist of items; the feature database 133 may store features of items: the training database 134 may store training data used for training classification models as described below; the test database 135 may store test data for testing classification models as described below; the classification database 136 may store classifications of items.

In some examples, the one or more databases 130 may be maintained by the computing devices 110, the server 120, or at a location that is directly connected with the server 120 and/or the computing devices 110. In other examples, the one or more databases 130 may be located at third-party vendors, such as threat intelligence vendors. It should be appreciated that the one or more databases 130 may be organized in any suitable way that can support security determination and presentation services as described in the present disclosure. The one or more databases 130 may be broken into subsets of data and processed in parallel by separate systems. The one or more databases 130 may be updated periodically.

Figure 2:
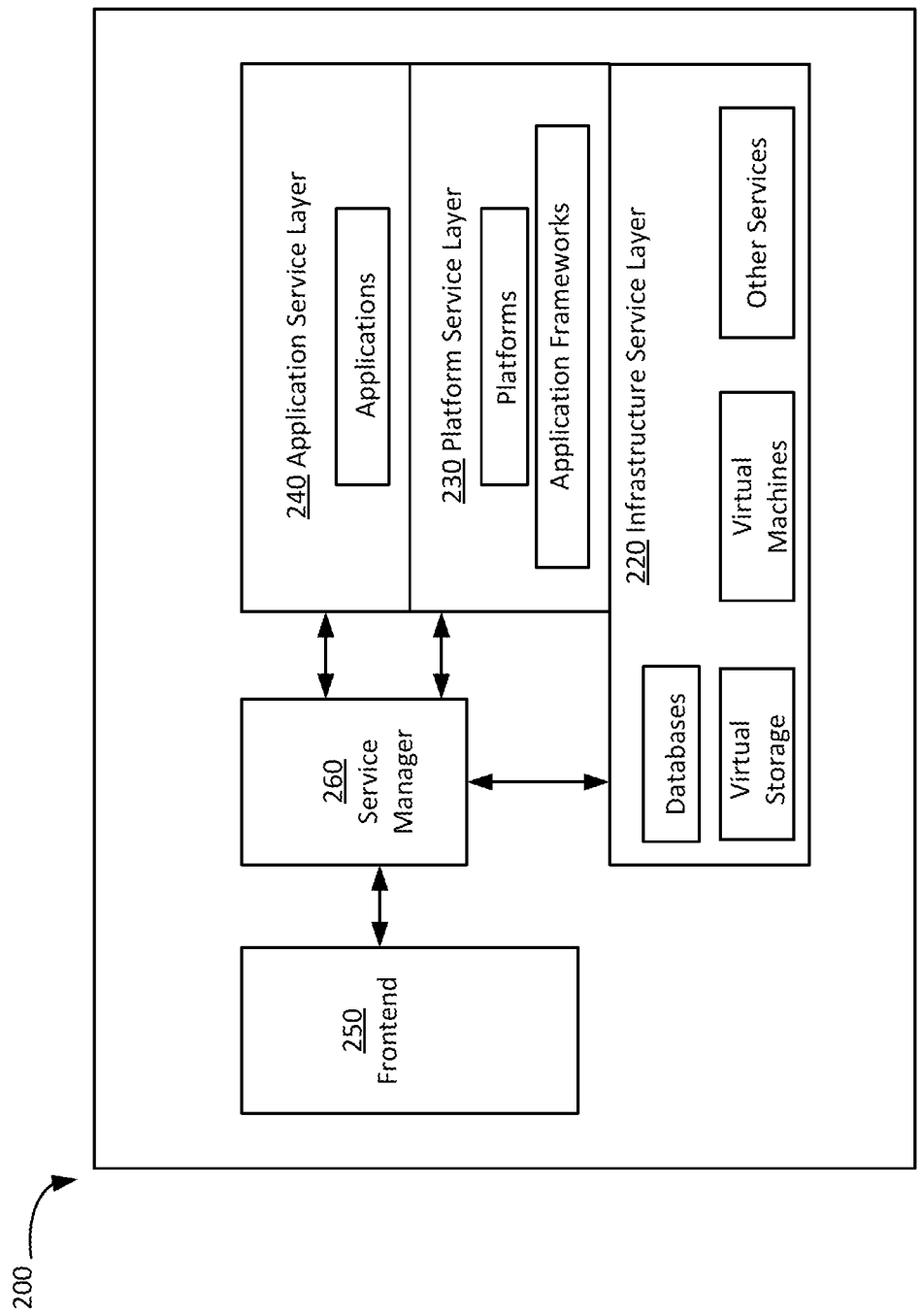
FIG. 2 is a schematic diagram illustrating an example cloud-based server that may be used in accordance with the present disclosure.

FIG. 2 is a schematic diagram illustrating an example cloud-based server 200 that may be used in accordance with the present disclosure. The cloud-based server 200 may provide infrastructure services, platform services, and software application services. The infrastructure services may include virtualized resources, such as virtual machines, virtual storage, and so on. The infrastructure services may also include virtualized services, such as database services and others. Each of these infrastructure services may be deployed in an infrastructure service layer 220.

The scale and various aspects, such as data, connectivity, and dependency relationships within and between service components, of an infrastructure service deployment are configurable by an administrator user. For instance, the administrator user may submit a configuration specification to the cloud-based server 200 via a frontend interface 250 and service manager 260. The configuration specification can be translated into infrastructure and kernel level APIs calls that create, re-create, move, or delete components such as virtual machines and services, and assign or change attributes of the components.

In addition to the infrastructure services, the cloud-based server 200 may also provide platform services, such as an environment for running virtual machines or a framework for developing and launching a particular type of software applications. The platform services may be implemented in a platform service layer 230 over the infrastructure service layer 220, and may employ one or more infrastructure services configured in a particular manner. Configuration of platform services can be accomplished by program code written according to the APIs of the platform services and, optionally, the APIs of the infrastructure services that are employed in enabling the platform services.

In some examples, the cloud-based server 200 may also provide software application services in an application service layer 240. A software application can be installed on one or more virtual machines or deployed in an application framework in the platform service layer 230. The software application can also communicate with one or more infrastructure service components, such as databases, in the infrastructure layer 220. The installation and configuration of the software application in the application service layer 240 can be accomplished through APIs of the software itself and the APIs of the underlying platform and infrastructure service components.

Depending on the type of services, a cloud-service user may be granted different levels of control in configuring the services. For example, if a software application service is employed, an administrator user is given control over how the software application is configured. If a platform service is employed, an administrative user is given control over how the platform and/or application frameworks are configured. Similarly, if infrastructure services are employed, an administrative user is given control over the particular infrastructure services employed.

Figure 3:
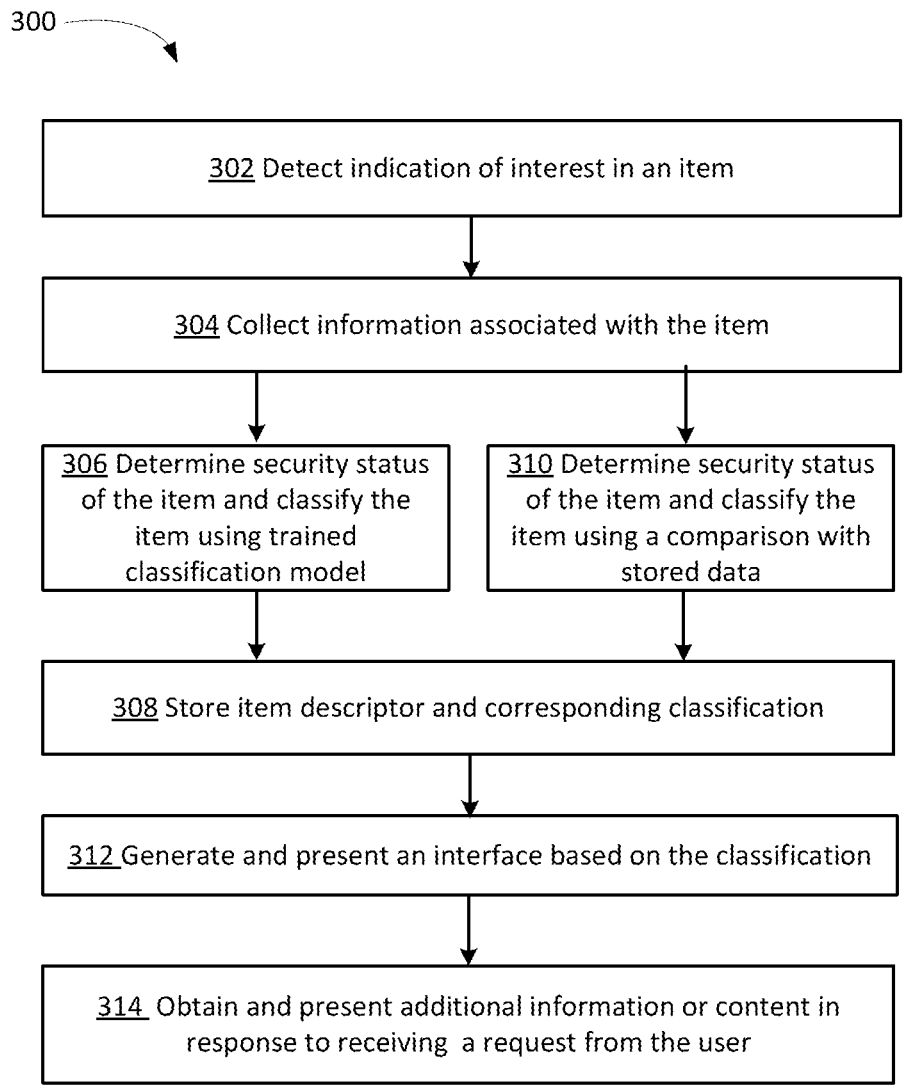
FIG. 3 is a flowchart illustrating an example process for use in accordance with the present disclosure.

FIG. 3 is a flowchart illustrating an example process 300 for determining and presenting security status of items. The server 120, such as the cloud-based server 200, the computing devices 110, or other computing devices may be used singly or in combination to implement the security status determination and presentation process 300. Although depicted as a sequence of operations, those of ordinary skill in the art will appreciate that various embodiments may add, remove, reorder, or modify the depicted operations.

At 302, indication of user interest is detected. For example, when a user hovers a mouse pointer or cursor over an item, it is determined that the user is interested in accessing the item. The item may be a hyperlink, an email, an attachment, a text message, a media element such as an image or a movie, an icon of a file or an application. Hover-over is not the only indication of user interest that may be used to trigger actions described below. For instance, as a user scrolls down a document, e.g., on a mobile device, using his or her fingers, the present disclosure determines the likely attention or interest, e.g., based on the user stopping at a position of a page where a given item (such as a button with a hyperlink) is rendered. If the user stays with this view for a threshold amount of time (such as at least one second) and lifts his or her fingers from the touch screen, then it can be determined as an indication of interest to trigger actions described herein below.

Alternatively, instead of determining interest by hover-over or by resting at a particular location, touching and holding a button can be determined as an indication of interest. Other indications of user interest may be determined, such as performing a swipe over a selectable element, making a circling motion on a screen around a selectable object, performing any action or gesture intended for activating a window, and so on. These user interactions can be detected by integration of a collection of selectable pixels in the area around selectable object, such as a hyperlink. Interactions with the selectable pixels are detected by an application (e.g., the application 112) or a service (e.g., the service 122), and actions as described below will be initiated. Indication of user interest is not limited to hovering a cursor over an item. For the sake of denotational simplicity, user interactions may be referred as hover-over which includes variations such as those described herein.

The techniques disclosed herein may be applied to a wide variety of hover-over contexts, such as hovering over a hyperlink in an email, text message or a webpage; hovering over an attachment in an email or text message; hovering over an icon indicating an application or file on a user computer; hovering over an image or video in an email, text message, webpage or stored on the user computer. The techniques disclosed herein also apply to hover-over of artifacts (such as those described above) that are not stored on the computer, or which are linked from the reference that is being hovered over. For example, if an artifact is stored on a cloud server instead of on a user computer or being attached to an email or text message, the techniques disclosed herein may be applied, except that the location is modified accordingly.

When a user hovers a cursor over a hyperlink included in an email or a document, some email readers and browsers may show the user a corresponding Uniform Resource Locator (URL) to allow the user to decide whether to click on the hyperlink. However, this approach can only help technical experts since it is known that URLs are hard for ordinary users to understand and interpret. Moreover, users typically ignore complicated review of URLs due to information overload and being habituated to click through to reach their destination. Existing technologies fail to safeguard end-users from security threats, such as phishing attacks.

It is the objective of the present disclosure to address such security risks. While the disclosed techniques are described in the context of hover-over of emails or documents, a person of ordinary skill in the art would understand that the same approach applies to other contexts, including but not limited to, hover-over in webpages, text messages, any online documents such as Lark™ docs or Google™ docs. The present disclosure also applies to devices with touch screens, where there is no direct notion of hover-over. The techniques disclosed herein may determine whether items are safe or malicious and present positive feedback, such as endorsements and explanations, that are easy for the users to understand and follow. A person of ordinary skill in the art would also recognize that the disclosed techniques will avoid information overload, avoid habituation that hurts the security posture of end users, and avoid additional user engagement such as additional clicks. These features are critical for the secure deployment and are important contributions by themselves.

At 304, information associated with the item may be collected. The present disclosure relates to conveyance and collection of information when a user has indicated interest in an item. In some embodiments, the item may be a hyperlink, an icon, or a URL appearing in a file, e.g., an email, message, a document, or a webpage. The collected information associated with the item may be invisible in the file as presented to a user. By way of example and without limitation, the collected information associated with a URL may comprise URL protocol or scheme, host/domain name and subdomain, port name, path (i.e., a path to a specific page or file), query, parameters, fragments of a URL string, frequency (average, percentiles), creation date, expiration date, last updated date, Sender Policy Framework (SPF), DomainKeys Identified Mail (DKIM), Domain-based Message Authentication, Report and Conformance (DMARC), third-party threat intelligence, domain reputation information, and so on In one example, a user may have two windows open on his or her computer, and the two windows correspond to two different applications. Depending on the location of the mouse pointer or cursor, it may be determined that the user is interested in the first application. The first application may receive information relating to the location of mouse pointer or cursor, and determines corresponding functional element, if any. Based on the selection of the functional element, the selected application extracts associated content. The associated content may be information, such as a URL, associated meta-data, e.g., WHOIS (short for "who is responsible for this domain name") information associated with the URL, and so on. In another example, the functional element may be an attached file. In this example, the extracted information may be meta-data related to the attached file, such as whether it is encrypted, whether it contains macros, what tool was used to generate or process the attached file, the identity of the author of the attached file, etc.

In other embodiments, the selected application may extract contextual information related to the functional element. For example, this may be the content of a webpage corresponding to the URL, the Internet Protocol (IP) address associated with the webpage, images to be rendered on the webpage, and text to be rendered on the webpage. As another example, the contextual information may be information regarding the functional capabilities of the content, such as whether it contains scripts; whether such scripts are likely to contain obfuscated information; and whether the content results in a redirection, such as the loading of additional content at the time of rendering.

In one embodiment, the present disclosure is used to improve the detection of potential fraud. One example usage comprises differentiating between legit actions performed by real users and malicious automated scripts acting with the goal of pursuing fraud activities. For instance, a malicious Microsoft™ Excel™ or Word™ file on a user's local computer or an email attachment contains malicious URLs and/or macros, which could access user emails and personal information when the file or the attachment is opened. This is known to be possible by a VB script (Visual Basic Script), for example, and protecting against such scripts is a problem that has been insufficiently addressed. A real user would typically open the file or the attachment, hover the mouse over the URLs or the macro button, and then click on the URLs or the macro button to proceed. However, automated scripts do not normally have actions of hovering the mouse over a link and hence lack particular features such as mouse movement/hovering and time to action). Therefore, the disclosed techniques can protect content and avoid disclosing sensitive content to scripts by detecting hover-over or other user engagement actions to distinguish a user action from a scripted action.

The disclosed techniques may also be used to alert an Account Take-Over (ATO) detection component, which may initiate corrective action. Scripts actions are mainly associated with no hovering activities and with zero time to action, but are also exhibiting other characteristics. e.g., requesting resources without moving the mouse, or moving the mouse in a manner that is not typically associated with a human-initiated action, e.g., along perfect lines or with perfect precision. For attachments containing macros, these could be automatically triggered to execute right after the file is opened, which would initiate actions that also are not characteristic of user-initiated actions, such as the access of 100 documents within a second. The techniques disclosed herein may evaluate URLs included in the file and, upon identifying malicious, stop automated scripts from being executed or, upon finding suspicious, present the user a Completely Automated Public Turing test to tell Computers and Humans Apart (CAPTCHA) or similar challenge to differentiate real users and automated users. To prevent that the CAPTCHA is exported to a user in cahoots with the malware author, the system may block outbound transmission of certain data for a duration of time until the CAPTCHA has been solved. The present disclosure may decrease a number of such fraud activities by evaluating the URLs in the files before the user opens them.

At 306, the security status and classification of the item may be determined using trained classification model. In some embodiments, the items may be classified into at least three categories, e.g., safe or good material, malicious or unsafe material, and undermined or unknown material. More detailed classifications may be further performed. For example, the safe material may be further classified to several types of safe material, such as material provided by a trusted company, material created by a trusted contact, material passing a content test indicating that it is secure, and so on. Similarly, unsafe material may be further classified to several types of unsafe material, such as material that poses a risk of phishing, material that poses a risk of malware, material that poses a risk of deception, material that is likely to contain doctored images, and more. In an alternative embodiment, the items may be classified into two categories, such as safe enough to render and not safe enough to render.

In some embodiments, the classification is performed by one or more classifiers at one or more different points in time. For example, a first classification can be performed at the time the information is first accessible, which may be when an email is received, when a webpage is first rendered, when a file is stored on a computer, etc. A second classification can then be made at a later time, such as the time when a hover-over or other user interaction is performed. In an example, material that was not known may be first identified as high-risk at the time of message delivery, but it may be reclassified after additional information about the unknow material has been acquired by the system. If multiple hover-over or other user engagement actions are performed, a new classification evaluation can be performed for each time. This enables new information and data to be used to improve previous classifications.

Furthermore, the classification can be performed by multiple specialized classifiers, e.g., a first classifier identifying malware risk and a second classifier identifying webpage risk, which could entail the risk of deception or the risk of undesirable content. Some of the classifier may be external, i.e., executed by a vendor or a cloud resource, whereas other classifiers may be local to a server (e.g., the server 120) that a user interacts with to render material, or even local to the user device (e.g., the computing device 110) used to access the material and perform hover-over or other engagement actions by the user.

Figure 4:
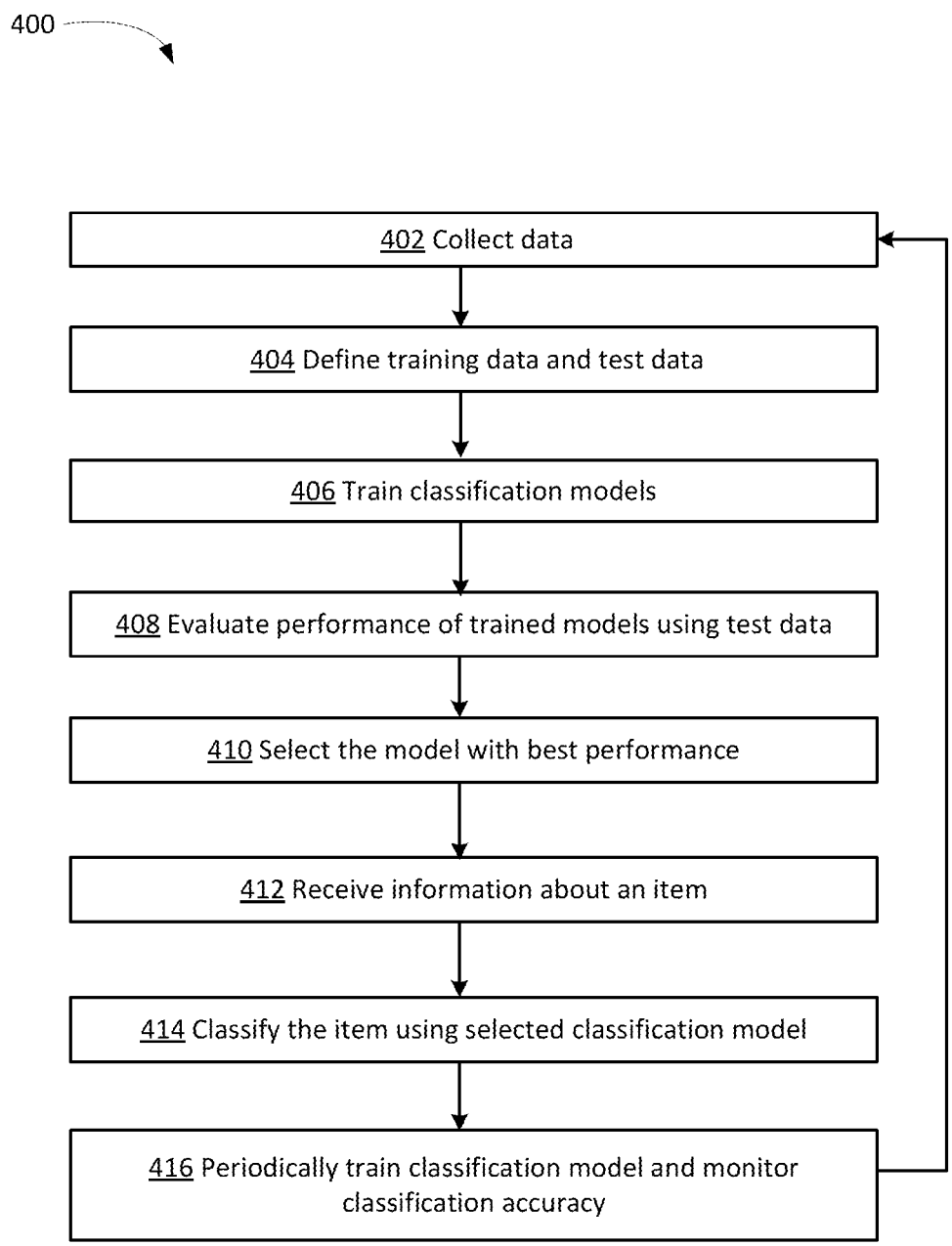
FIG. 4 is a flowchart illustrating an example process for training classification models and using a trained classification model for classifying items that may be used in accordance with the present disclosure.

In some embodiments, the classifiers may be trained classification models. FIG. 4 is a flowchart illustrating an example process 400 for training models and using a trained model to classify items. A server (e.g., the server 120) or other computing device (e.g., computing device 110) may be used singly or in combination to implement the process 400. Although depicted as a sequence of operations, those of ordinary skill in the art will appreciate that various embodiments may add, remove, reorder, or modify the depicted operations. While embodiments of classifying URLs, for convenience and simplicity, will be described in greater detail herein, it is to be understood that the present disclosure is not limited to URL classification and could be used for classifying any other items, such as an email, an attachment, a text message, a media element such as an image or a movie, and an icon of a file or an application.

Operation 402 illustrates collecting data. In some embodiments, data may be collected from any components of the system (e.g., the system 100), such as the whitelist database 131, the blocklist database 132, the feature database 133, and the classification database 136. In other embodiments, data may also be collected from any third-party vendors and services such as Alexa 500 and Cisco Umbrella.

Operation 404 illustrates defining training data and test data. Preferably, two separate and independent sets of data are defined as training data and test data, respectively. The set of training data will be used to train classification models. The set of test data will be used to test the classification models and evaluate their accuracy. By way of example and without any limitation, the training data may be stored in the training database 134 and the test data may be stored in the test database 135.

Operation 406 illustrates training classification models using the set of training data. To well train classification models, it is preferable to have sufficient training data. By training, a classification model learns a correlation between features of items (e.g., URLs) and classifications of the items (e.g., URLs). In one example, the training data comprise various features of a set of URLs and corresponding classifications of the URLs. The features of URLs may comprise URL protocol or scheme, host/domain name and subdomain, port name, path, query, parameters, fragments of a URL string, frequency, creation date, expiration date, last updated date, SPF, DKIM, DMARC, third-party threat intelligence, domain reputation information, and so on. By way of example and without any limitation, the classifications of the URLs may comprise safe, unknown, suspicious, and harmful.

Operation 408 illustrates evaluating performance of the trained classification models using the set of test data. In one example, the test data may be another set of URLs and comprise features and corresponding classifications of the set of test URLs. The features of the test URLs are input into the trained models. The classification results output from the trained models are paired with and compared to the corresponding classifications of the set of test URLs. The corresponding classifications of the test URLs may be received from the test database 135. Various techniques may be employed to evaluate trained classification models. The performance of the trained models may be evaluated using any suitable measurement and evaluation metrics such as classification accuracy, precision, recall and Area Under Curve (AUC). At 410, A trained classification with the best performance is selected as the final model for deployment.

Operation 412 illustrates receiving information about an item. For example, when a user hovers a mouse cursor over an item, information about the item are collected, extracted, and parsed. The collected, extracted, or parsed information about the item is input into the selected classification model for classifying the item. By way of example and without limitation, the item is a URL and the information may comprise features of the URL. The features of URL may comprise domain name and subdomain, port name, path, query, parameters, frequency, creation date, expiration date, last updated date, DKIM, third-party threat intelligence, domain reputation information, fragments, etc. An example of a fragment is information in the query string of a URL, e.g., parameters separated by ampersands. For instance, the text portion "#Spam_techniques" in the URL "https://en[.]wikipedia[.]org/wiki/Email_spam#Spam_techniques" is an example of a fragment.

Information about an item (e.g., features of a URL) may be used as input to the trained classification model. The trained classification model may then generate and output classification results at 414. In one example, a URL may be classified to a safe, unknown, suspicious, or harmful category by the trained classification model. The trained classification model may periodically be retrained as showed at 416. In some embodiments, the performance of the trained classification model may be monitored on an on-going basis and used as a trigger to iterate operations 402 through 410.

In some embodiments, the trained model is a supervised multi-class neural network classifier. The supervised multi-class neural network classifier requires a high-quality training dataset, e.g., a set of URLs as training data requiring that labels of the URLs are known. The labels of target URLs to be classified using the trained supervised classifier are also required to be known. However, in the case of classifying URLs included in emails' body, the nature of the problem is very complex given there exists so many different URLs where their labels are unknown. Even if a training dataset with target labels for some of known URLs is available, the classifier would typically be only as good as the data that it has been trained on. To overcome this challenge, an unsupervised machine learning framework may be used.

Figure 5:
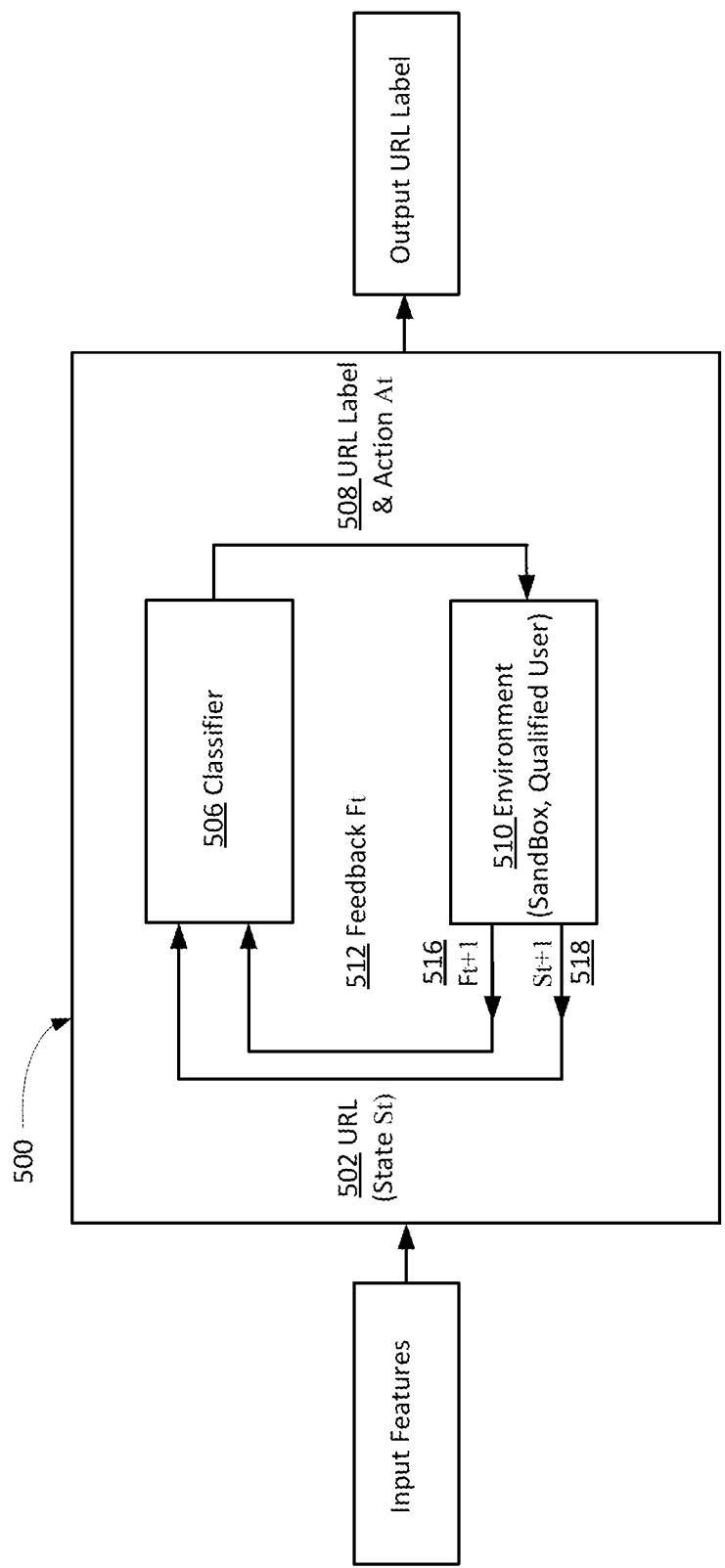
FIG. 5 illustrates an example process for training a Reinforcement Learning model that may be used in accordance with the present disclosure.

In one embodiment, a specific type of unsupervised machine learning framework, namely Reinforcement Learning (RL), may be used to classify URLs included in email body as safe, suspicious, and harmful. The RL model learns entirely by itself to which class or category any given URLs inside an email body belong. FIG. 5 illustrates an example process of training a RL model 500.

The RL model comprises three main elements; 1) Agent or classifier 506, which commits actions at a given state and predicts the label of a URL and determines if it is safe to click on a given URL or not; 2) Environment 510, which responds to the agent's prediction and sends a reward/penalty feedback to the agent; and 3) state, which is the current situation of the system. At each state (St), a decision to be made by the model on the label of the URL to be classified and whether it is safe to be clicked on may be referred to as Action (At), and a resulting feedback to be sent to the classifier may be referred to as Feedback (Ft).

URL-specific features, such as URL protocol or scheme, host/domain name and subdomain, port name, path, query, parameters, fragment, frequency (e.g., daily/weekly/monthly counts), creation date, expiration date, last updated date, SPF, DKIM, DMARC, and third party threat intelligence, forms the feature pool. The feature pool may be stored in one or more databases, such as the feature database 133. In order to train a RL model, features of sample URLs are selected and fed into the RL model 500. The feature pool may be used to train the RL model. This training process is run with many URLs.

At a given state St, features of a given URL are fed into the classifier at 502. At 508, the classifier makes a decision with respect to the URL label and take an action At, e.g., clicking on the URL if it is determined to be safe. In order to enable the RL model to learn entirely by itself, the only feedback that is given to the RL model is in the form of a reward—if the classifier makes a right decision—or a penalty—if the classifier makes a wrong decision. In some examples, the output of operation 508 is verified in the Environment 510 against Qualified User feedback (trusted decision) or inside a Sandbox. At 512, the classifier receives a feedback Ft (a reward or a penalty). If the classifier's decision turns out to be correct, a reward is sent to the classifier. On the contrary, if the classifier's decision turns out to be incorrect, a penalty is sent to the classifier. As shown at 516 and 518, this iterative process is repeated many times with various URLs and corresponding features in order to train the RL model. Once the RL model achieves satisfactory performance, the trained RL model will be used to predict the labels of incoming URLs based on their corresponding features.

At the beginning of the training process, the RL model may make a lot of mistakes since it hasn't learned anything useful yet. But at some points, the RL model makes right decisions and hence receives rewards. During the training process, incorrect decisions are under-sampled so that the likelihood of making wrong decisions is decreased as training progresses. On the contrary, correct decisions are over-sampled to increase the likelihood of making correct decisions. It would be appreciated that there are multiple ways to provide the RL model a reward or a penalty. In one example, the model is trained inside a sandbox where model's misclassification of a malicious URL as a safe URL and clicking on the URL is penalized. On the contrary, correctly classifying a malicious URL and not clicking on the URL is rewarded. In another example, the decision by a Qualified User is the ground-truth for rewarding or penalizing the RL model. A Qualified User is a trusted user whose spam/unspam action rate is no different than the decisions made by the disclosed spam service more than 1% of the time, for example. Other accuracy thresholds can also be set, as would be appreciated by a person of ordinary skill in the art. A person of ordinary skill in the art would also appreciate that other implementations not using RL are possible, including for example, Decision Tree Algorithm, Random Forest Algorithm, or Naive Bayes Classifier, and so on.

Referring back to FIG. 3, information indicative of an item and corresponding classification may be stored at 308. Upon making a classification (e.g., an item being classified using a trained model), the techniques disclosed herein may generate and add a tag to the item, such as a header, a javascript component, or another set of instructions indicating the outcome of the classification. The tag may be consumed by rendering engine or a controller that determines what action to take upon a hover-over or similar event. Such actions may be to display a notification or other user interfaces as described below, or to perform one or more additional classifications and then an optional action. In other embodiments, the classification processing is performed as a hover-over event is identified. In either case, one or more classifications may rely on previously made classifications, e.g., classifications of related items where these classifications comprising item descriptors/indicators and classification information have been stored in one or databases, such as the classification database 136.

One example of item descriptor is a hash value describing the item. The hash value may be a cryptographic hash or the type of hash that is commonly used for database lookups. Another example of descriptor is the item itself, such as a URL, or parts thereof, such as the domain and subdomain or a URL. Yet other descriptors may be signatures such as the signatures used for detection of malware, whether these are formed from the static code of the malware or formed to describe the behavior of the malware. A person of ordinary skill in the art would understand that there are many variations on how to generate descriptors.

Having access to a database (e.g., the classification database 136) with such descriptors and associated classification information is beneficial as it speeds up classification efforts. However, since classifications commonly change over time, as more information is obtained or the nature of a threat changes, the entries in the database are preferably updated as this happens as well. One descriptor can correspond to multiple classifications, and therefore, there may be multiple records using the same descriptor as their key; alternatively, some records in the database may contain multiple classifications, where some of these may be a temporal sequence of classifications and others may be contemporaneous.

At 310, the security status and classification of the item may be determined by comparing with stored data. The items and corresponding classification results obtained at 310 may also be stored into a database (e.g., the classification database 136) and used for later classification. By way of example and without limitation, the stored data may comprise data stored in the whitelist database 131, the blocklist database 132, the classification database 136, and other databases.

In one embodiment, the techniques disclosed herein monitor and record information regarding specific features of emails with malicious URLs, such as IPs, sender domains, header domains etc. Over time, a comprehensive feature pool for emails with malicious URLs in their bodies is constructed. The feature pool data may be stored in one or more databases, such as the blocklist database 132, the feature database 133, etc. The items may be classified by comparing extracted information about the items with stored data, such as whitelists, blocklists, and previous classification information. The stored information may be maintained by a system (e.g., the system 100), or be acquired from any third-party providers, such as security service providers.

In some embodiments, the items may be classified into three categories as shown in Table 1 below. Other embodiments may comprise any additional categories. Another category may be a classification of items that a user accessed before, such as a classification of websites previously accessed by a user. This would include any webpage within a domain that the user has previously visited, except for the domain that has been classified as Good or Bad, in which case the Good or Bad classification is given a higher priority.

TABLE 1

| Classification name | Classification meaning |
|---|---|
| Good | A whitelisted item. For instance, anything on Alexa500 that does not have user generated content (UGC) can be whitelisted. |
| Bad | A non-whitelisted item that triggers an alert. In some embodiments, names from whitelisted websites, such as "PayPal" and "WellsFargo" (referred to as "good names"), can be extracted. Any URL that is not on the whitelist but has a good name in its subdomain or domain name is considered bad. For example, "paypal.high-security.com" is determined to be bad because of including "paypal" in its subdomain, but not belonging to PayPal. The system can also perform normalization before the comparison, e.g., removing non-letters. For example, "pay.pal-high-security.com" would then be detected as bad after the period and the hyphens are removed and the comparison performed. The system can also detect URLs containing strings that have small hamming distance to good names. For example, ByteDnce.com would be determined as bad this way. Another approach is to cause all URLs in messages placed in the spambox to be considered bad. |
| Unknown | Everything that is not good or bad. |

In some examples, based on statistical methods for detecting outliers, IPs and Domains with abnormal contributions to misclassified spam emails may be identified. Z-score has proven to work very efficiently to detect outliers by measuring how many standard deviations a random variable is away from the mean of the time series. However, it is noteworthy that not all outliers are malicious. In order to detect malicious IPs and Domains, the present disclosure may cross-validate detected outlier IPs and Domains against independent ground-truth data sources such as Cisco Umbrella or Amazon popular domains. IPs for such domains are extracted via Linux commands, such as the command dig. Alternative extraction approaches may also be used. The resulting flagged outliers are registered into a blocklist to prevent spammers from spamming the system from these detected malicious IPs and Domains. The blocklist may be stored in the blocklist database 132.

The blocklist, in one embodiment, is updated on an hourly basis. For example, to make sure the once-detected-as-malicious IPs and Domains do not stay in the blocklist forever, the IPs and Domains in the blocklist aged more than 14 days may be removed. However, the system keeps track of the number of times a given IP or domains is registered in the blocklist. The higher this number, the higher the risk of the IP or domains would be. For high risk IPs and domains, one implantation is to block emails from them before reaching users' inboxes or spam boxes. By doing that, the number of false positives and the amount of resources needed for scanning URLs inside emails bodies and for showing proper hover-over messages are reduced.

At 312, an interface is generated and presented based on a corresponding classification of the item. The techniques disclosed herein may determine content to be presented to users based on classifications of items, generate an interface comprising the determined content, and present the interface in a manner that is actionable to the users. The interface may be generated based on items, their corresponding classifications, and any other information related to the items.

The techniques disclosed herein may determine and configure content and functions included in an interface based on a corresponding classification of an item. Example determinations and configurations comprise what messages will be presented for different contexts, such as whether a detailed message or a simple message will be presented, and whether selectable options will be presented to a user for each type of message, and if so, what available options are. The determinations and configurations may further comprise selections of icons, color schemes and fonts to be used for various types of messages included in the interface, and so on.

The techniques disclosed herein may determine different types of messages corresponding to different classifications of items. By way of example and without limitation, endorsing messages may correspond to safe or good items, warning messages may correspond to malicious or bad items, any other explanation messages may correspond to items with undetermined or unknown security status. In one embodiment, some endorsements and warnings displayed to users may be selected from a database, where the selection is based on the language setting of the user. This way, a user who has set English as her preferred language obtains endorsements and warnings in English, whereas a user with another language selected as the preferred language will obtain endorsements and warnings in that language. Icons used for notifications, whether warnings or endorsements, may also be dependent on the language settings or may be configured by an admin. Messages that are associated with classifications that are neither good nor bad but with unknown classifications may be selected using other approaches.

In some examples, the interface (e.g., a popup window) may not be rectangular as traditional, instead, the interface may have different shapes based on classifications of items. For example, an interface comprising a warning may be hexagonal-shaped, mimicking a stop sign. On the other hand, an interface comprising an endorsement may have the shape of a thumbs-up. Similarly, nested approaches may be used, such as a hexagonal display area inside a rectangular interface. Other visual and audio indications can be used to convey information as well as, for example, tactile alerts when a warning is displayed. Such approaches reduce the risk of habituation due to information overload, which is a common problem in the context of security services and user communication methods.

One type of item that may be associated with risk is an HTML file that may be attached in an email. The HTML file may pose a risk because it may request user credentials (e.g., username and password and even Two-Factor Authentication (2FA) data) and submit the user credentials to an external website, for example. As classification is performed, the classification engine may identify an HTML attachment with the capability of submitting data to an external location and warn a user of this at hover-over. Moreover, the techniques disclosed herein may take actions in response to this classification of risk. The actions may comprise modifying the HTML code so that it cannot submit data to an external location; adding a script that performs a hover-over alert to a user; modifying the location of the submission to a proxy where the data is stored and analyzed before a decision is made whether to forward it to the original location. This determination may depend on the format of the data submitted, the reputation of the original location, an admin action, user approval, combinations and variations of these actions.

In some embodiments, generating messages may be based on information, such as the identity of a resource host, originator, transmitter, etc. In some instances, the information may be used to customize the messages, i.e., to determine and generate a user-accessible description of an entity based on a machine-accessible encoding of the same. Example machine-accessible encodings include but are not limited to digital signatures, digital certificates, security assessments using DMARC, security determinations using security building blocks that determines whether an entity is a trusted entity or not, analysis of URLs and WHOIS information, and so on.

Example user-accessible information is a name of an entity, such as "Bank of Oklahoma" or "Your colleague Joe Schmo," and icons or other images, such as logos and user avatar images, etc. Additional types of user-accessible information comprise icons used to endorse, such as a shield image, and icons used to warn, such as a stop sign image or a skull with crossbones. The disclosed techniques may perform operations that users cannot perform to determine security assessments, as detailed herein, thereby not only speeding up security determinations but also dramatically changing threat evaluation efforts, leading to new opportunities that have not been possible using prior art systems.

The generated interface can be presented upon a hover-over or triggered by a user action such as rendering a window active. For the sake of denotational simplicity, presenting an interface upon a hover-over is merely for illustrative purpose. It would be appreciated that the techniques described herein may be applied to other contexts. For example, the interface may be presented as Excel™ spreadsheets are requested to be opened, encrypted zip files are requested to be unpacked, or any other contexts.

The interface may be presented after an initial period of time has elapsed after a hover-over or similar event was detected, e.g., after half a second. This avoids the interface to be provided to users who merely move their mouse over a message with hyperlinks. The delay may be set as a function of the mouse movement speed or the key repetition speed. These two parameters are both indications of the speed with which a user expects to perform actions and be provided with information. Optionally, the delay can also be set as a separate configurable parameter, whether by the user or an administrator.

The interface may comprise endorsing messages, warning messages, any other explanation messages, and one or mor interface elements that are selectable by the users. By way of example and without limitation, endorsing messages may comprise "Verified website. Confirmed to belong to Bank of New Hampshire"; "This spreadsheet was created by your colleague Max Friedman"; "The attached file comes from one of your trusted senders"; "You have visited this website 4 times before"; "This is an internal website"; and so on.

The messages included in the interface may be configured based on the content and/or context information. For example, endorsement messages may be displayed in green, and use a font different from the one used for warning messages. The messages may also be accompanied by a graphical representation such as an icon of a shield, a smiley, or an image representing the sender or originator of the resource. For example, for a hyperlink sent by a colleague, an image of the colleague may be retrieved from a database such as Lightweight Directory Access Protocol (LDAP) and included in the endorsement message. Another example is that for an item associated with a recognized bank, the logo of that bank may be displayed along with the endorsement message.

Figure 6:
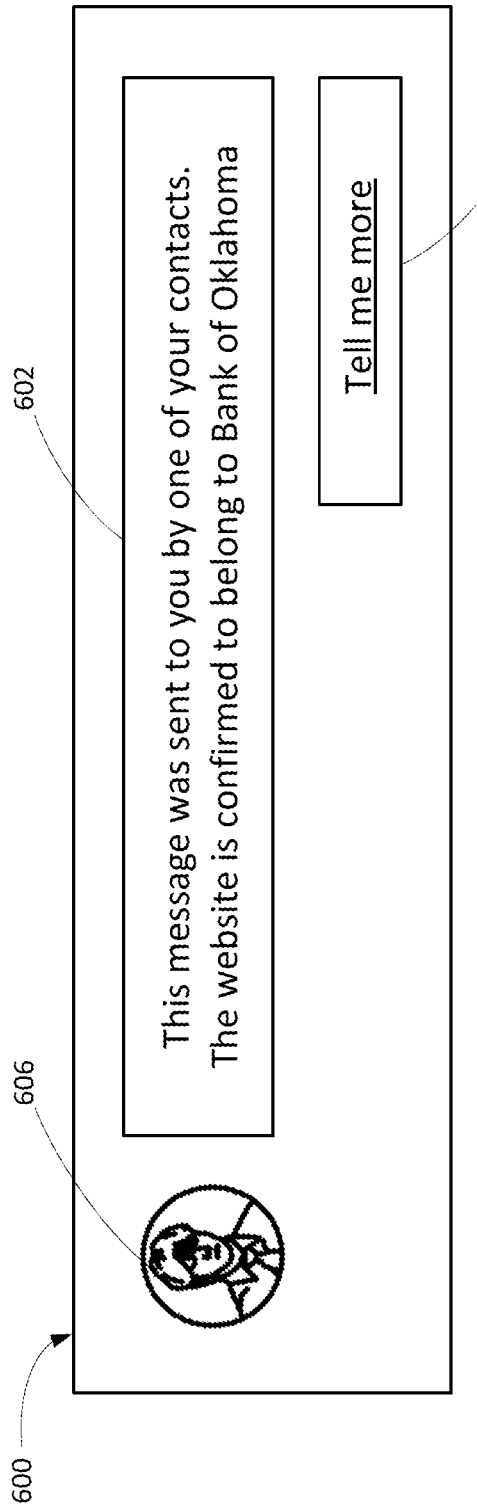
FIG. 6 illustrates an example user interface 600 that is generated and presented in accordance with the present disclosure.
Figure 11:
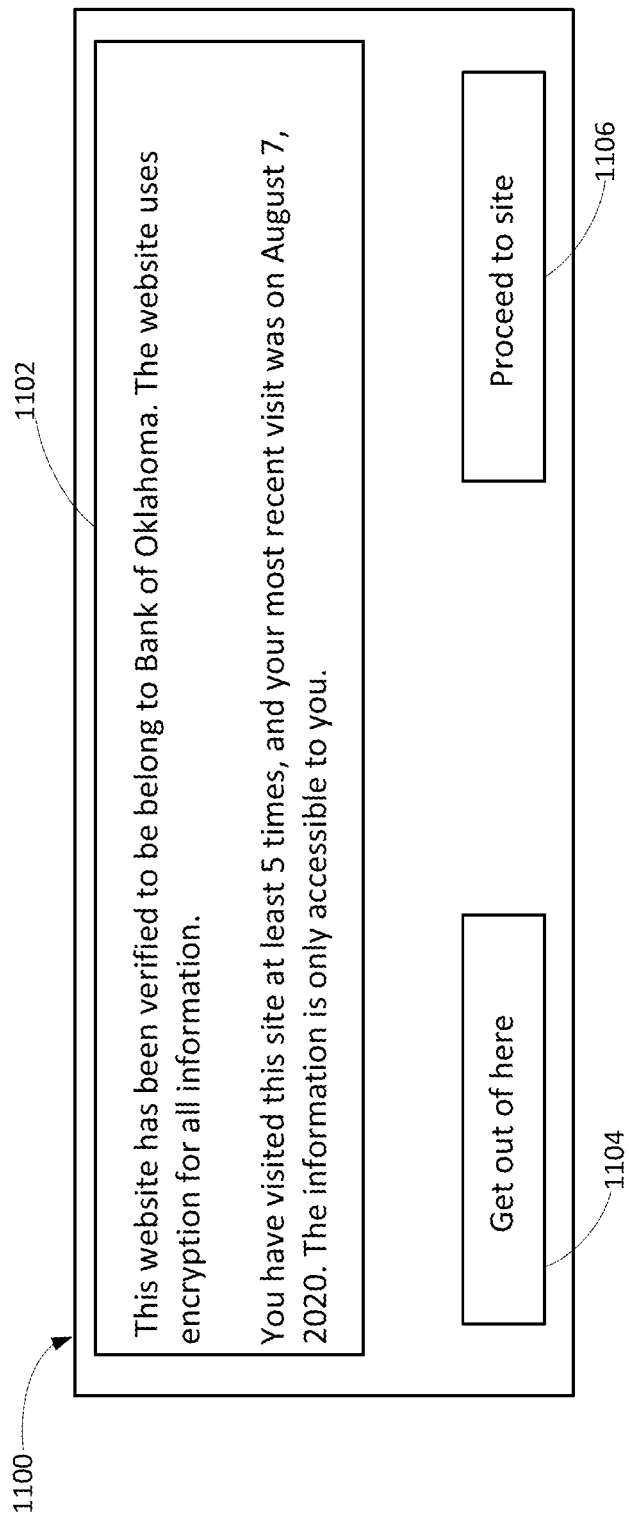
FIG. 11 illustrates an example user interface 1100 that is generated and presented in accordance with the present disclosure.

FIG. 6 illustrates an example interface 600. The interface 600 comprises endorsement messages 602, a selectable element 604, and a selectable icon 606. The endorsement messages 602 comprise content confirming that the website corresponding to an item (e.g., a URL in a message) is good. Optionally, the interface 600 may further comprise the selectable element 604. The selectable element 604 in FIG. 6 is shown as a text, but it may also be an image, a button, or other elements which, as a user would understand, the user can interact with. A selection of the selectable element 604 would cause additional information (e.g., as illustrated in FIG. 11 and described below) to be presented to the user. Optionally, the interface 600 may further comprise the selectable icon 606, which in this example is an image of the contact, retrieved from a database associated with the user performing a hover-over or other similar events. Additional icons, not shown, may illustrate additional information conveyed in FIG. 6, such as a logo of the party to whom the website in this example belongs, or a shield illustrating that this is an item/resource that is believed to be secure.

By way of example and without limitation, warning messages may comprise "Warning! This website may be dangerous"; "Warning! Resource may contain deceptive material"; "Pay attention: Some material may not be factual."; "Warning! Encrypted files cannot be scanned for viruses and malicious macros."; "The attached file originated outside your network"; and so on.

The warning messages may be displayed in red, potentially using a font used specifically for warnings, and may be accompanied by icons or other graphical indicators, including small videos, that alert the user to the risk and/or informs the user of the nature of the content.

In one example, with respect to items, such as images, videos and other media, the interface may comprise additional information, such as warnings "This media has been found to have been tampered with"; "This recording has been manipulated"; and "This recording includes forged media elements"; and so on. In another example, the interface may further comprise origination information, such as "This image was shot on a Nikon D90"; "This photograph is registered to Joe Schmoe"; "This video has been endorsed by the political action group CarrotsForBunnies"; as so on. In further examples, the interface may comprise interactive menus via which a user is provided certain information and can select to obtain additional information. The interface may further comprise an on/off icon that can be used to open or close the media. This can be done by rendering software, or by a filter that processes the interface into which the media is integrated.

Optionally, an alert may be invoked in situations where a high risk is determined. In addition to providing user messages, as described above, the techniques disclosed herein may conditionally modify the action taken as a user clicks on a hyperlink, which is separate from the display of a hover-over message. For example, one action is to open a pop-up window in which additional information is given to the user, and the user is optionally required to acknowledge the receipt of this information, make a selection, or otherwise perform an action before the requested content is loaded. Additional security measures may also be invoked in such high-risks situations: one example is to open the requested material in a safe environment such as a virtual machine (VM), a safe browser (that may not offer all features of a normal browser), or in a sandbox.

Figure 7:
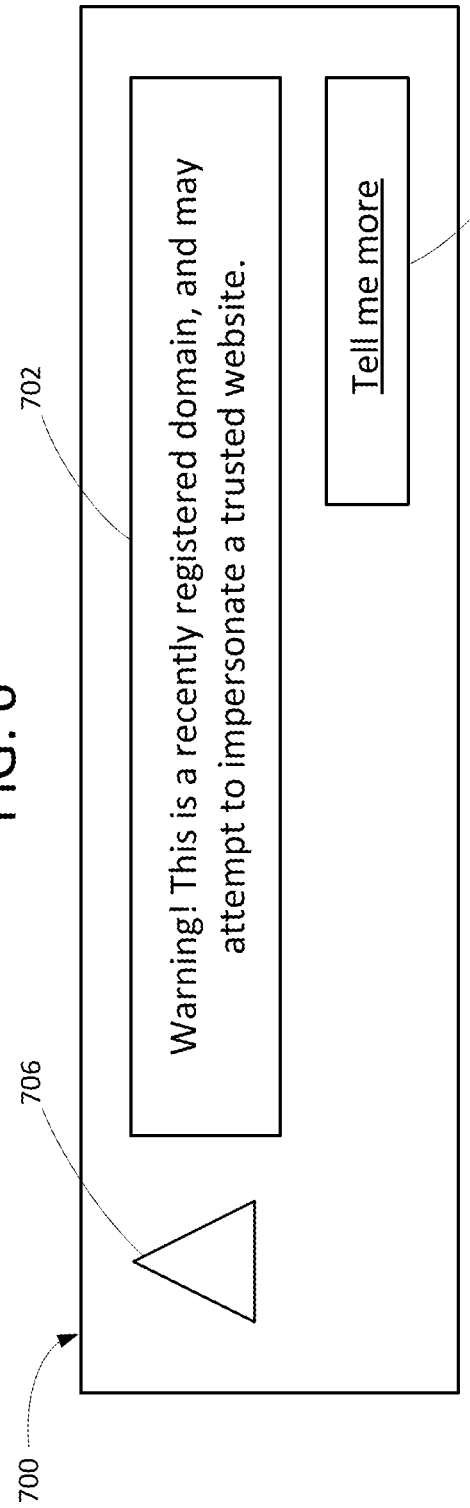
FIG. 7 illustrates an example user interface 700 that is generated and presented in accordance with the present disclosure.

FIG. 7 illustrates an interface 700 comprising an example warning message 702. Like any other interfaces described herein, the interface 700 may be a window different from traditional windows, e.g., may not have any chrome. The interface 700 comprises a text component, i.e., the warning message 702, that explains a resource associated with a hover-over or similar event to the user. The interface 700 may also optionally comprise a selectable element 704, similar in functionality to the selectable element 604 as shown in FIG. 6. Optionally, the interface 700 may further comprise an icon, which in this instance is a warning sign 706.

FIG. 8 illustrates an interface 800 comprising another example warning message 802. The interface 800 may be displayed either in a context of a user doing a hover-over in a message attachment corresponding to a spreadsheet, or in a context of doing a hover-over on his or her desktop or a folder where the spreadsheet is placed. The interface 800 may be a pop-up window displayed in response to the hover-over event. The interface 800 comprises two example selectable buttons 804 and 806 that a user can select. The selectable button 804 may cause the macro to be removed or disabled, after which the file is opened, whereas the selectable button 806 causes to open the file without removing or disabling the macro. It would be appreciated that any additional options may be further provided. Similar messaging may be used to convey other security-relevant status of files, including files that are not spreadsheets.

FIG. 9 illustrates an interface 900 that can be shown on a hover-over or as an interactive proxy. The interface 900 comprises a message text 902 and three selectable elements 904, 906 and 608. When a user selects the selectable element 904, the interface 900 will be closed. When the user selects the selectable element 906, the website will be opened in a regular browser of the user device (e.g., computing device 110). When the user selects the selectable element 908, the website will be opened in a secure browser environment in which only some functionality may be available. Unlike example interfaces as shown in FIG. 5-8 in which a user can access an item by simply clicking his or her mouse, such functionality is disabled in the interface 900. A user performing a hover-over and being shown the interface 900 would not be able to click at the location of the mouse when the hover-over was performed to access the resource. Instead, the user would have to move the mouse to the selectable element 904, 906 and 608 to take a corresponding action, or alternatively, move the mouse out of the hover-over area as well as out of the interface 900, so as to close the interface 900 potentially after a brief delay such as half a second.

As a result of opening the item/resource in a secure environment, the resource may not retain all functionality. For example, where the resource is a website, the website may not render correctly, but will be safe to visit. In one embodiment, the secure environment is obtained by translating the website content to an alternative representation that is not a risk, e.g., by removing some scripts. This allows rendering in the standard browser but may still cause some functionality and appearance to be degraded. A similar type of messaging and secure environment processing may be applied to other scenarios as well, such as the opening of spreadsheets, pdf files, or other attachments and items from the desktop or other places in the file hierarchy of the user device. It may also be applied to encrypted files, such as the encrypted zipfile as shown in FIG. 10.

When a classification is that an item or resource belongs to an undetermined or unknown category, messages may also be presented to notify a user of this classification. For example, the messages may comprise "Security undetermined. Proceed with caution"; or a display of a corresponding URL. The messages may also contain one or more selectable elements, such as an underlined text stating "Tell me more." A user interested in obtaining more information can then, after a pop-up interface is displayed, move his or her mouse pointer inside the pop-up interface to the underlined text and then click on the mouse; after this user action is detected, an additional window may be opened and additional information may be further provided. In another embodiment, multiple options may be provided within the pop-up interface, whether represented as texts, as buttons, or as other selectable icons.

Figure 10:
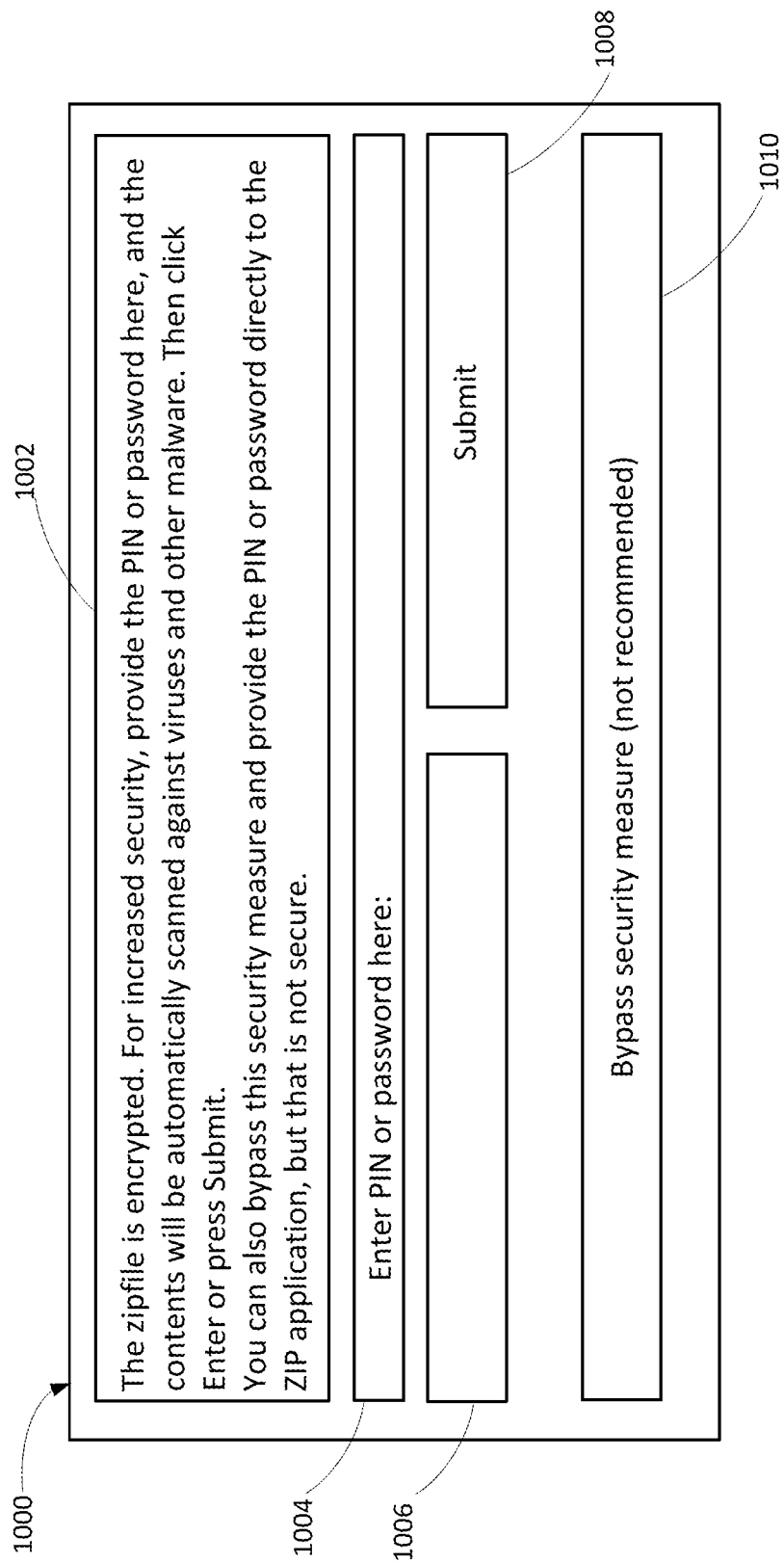
FIG. 10 illustrates an example user interface 1000 that is generated and presented in accordance with the present disclosure.

FIG. 10 illustrates another example interface 1000 that can be shown on hover-over or as an interactive proxy. The interface 1000 comprises a first text explanation 1002, a second text explanation 1004, a field 1006 to enter a PIN or password, and a selectable button 1008 to submit the data entered in field 1006, and a selectable button 1010 to bypass the security feature and open the item or resource, which in this instance is a zip file, but could also be another format, such as an encrypted file that potentially has scripts or macros, but where these scripts or macros cannot be scanned by since the file is encrypted.

When a user enters information in the field 1006 and clicks Enter or presses the button 1008, the information is submitted and is used to open the encrypted file. If this succeeds, an application performs a malware scan of contents of the file before saving or displaying the contents to the user. The malware scan can be combined with other types of scans for other types of unwanted or dangerous material, and any unwanted file can be modified, quarantined, disabled, reported, removed, or performed with a combination of these actions. In addition, a user or an administrator can be notified, or a filter can be updated to alert users of related contents. The interface 1000 can be shown as a user hovers over a website with an encrypted resource, or hovers over an attachment, or hovers over a saved file. It can alternatively be shown as a user performs the action of accessing a website or a file, whether attached to a message or saved on the user's computer. Similarly, for cloud-stored resources, where the user interacts with a link to the resource rather than the actual resource, the same functionality can be provided to the user.

Referring back to FIG. 3, at 314, additional information or content may be obtained and presented in response to receiving a request from a user. A selection of a selectable element, e.g., the selectable element 604 and 704 as shown in FIGS. 6 and 7, is one example of a user request. Another example of a user request may be a click on the mouse without moving a mouse pointer to the selectable element that is interpreted as a request to access the associated item, thereby causing to access and display content of the item.

FIG. 11 illustrates an interface 1100 comprising additional information as requested by a user. As shown in FIG. 11, the interface 1100 further comprises selectable interface elements, e.g., the selectable buttons 1104 and 1106, in addition to the endorsing messages 1102. When a user selects the button 1104, the interface 1100 will be closed without opening or accessing the resource, e.g., a website. On the other hand, when a user selects the button 1106, the interface 1100 will be closed but the resource, e.g., the website, will be opened or otherwise accessed. In this example, the resource is a website, whereas in other examples, the resource may be an attachment, for example: in such an example, the access of the resource corresponds to the opening of the corresponding application, such as Excel™, and the loading of the attachment in the application.

A user doing a hover-over with a mouse and being shown the interface 1100 may move the mouse pointer to button 1104 or button 1106 and then press the mouse clicker to select the button. This will initiate the corresponding operations. The user may also move the mouse pointer out of the interface 1100, which would result in the interface being removed. There may be a slight delay before the interface 1100 is removed in order to avoid user mistakes, e.g., by a user who shakes his or her hand a bit while moving the mouse pointer.

A user who makes a selection on a touch screen, e.g., by selecting a button or an icon, may also be shown the interface 1100. When the interface 1100 is shown on the touch screen, the user may move his or her finger within the interface 1100 to either the button 1104 or the button 1106, and then remove his or her finger from the touch screen. This will select the button and initiate the corresponding operation. Alternatively, the user may, upon the interface 1100 being rendered, remove his/her finger from the touch screen or move it outside the interface 1100, which will cause the interface 1100 to be removed. In one embodiment, a user using a touch screen and being shown an endorsing message (e.g., what is shown in FIG. 11) may simply proceed to the associated resource by holding his/her finger on the same location on the screen for a threshold amount of time after the interface 1100 has been rendered. If the user does not want to access the resource, he/she would have to move his/her finger at least a certain distance or release it from the touch screen within the threshold amount of time.

In contrast, a user being shown a warning message (e.g., the message in the interface 800 as shown in FIG. 8) would not invoke the access to the resource by keeping his/her finger held still, but would have to move to and select the button 804 or button 806 in order for an operation to be initiated. This difference in user experience further strengthens the security, as habits learned in one context (such as the context of secure content) would not cause risks in other contexts (such as in the context of insecure content). The same design principles apply to settings in which a user uses a mouse to point. A person of ordinary skill in the art would recognize that there are many variants of how to select options, including multiple rapid clicking, which can be required to access unsafe resources; motions made by a mouse or finger; the application of additional pressure, whether on a touch screen with multiple pressure detectors or using a mouse where the amount of pressure on a button is detected.

The disclosed techniques herein improves the security posture of a user in multiple ways, as would be appreciated by a person of ordinary skill in the art. Examples of these benefits include a conveyance of meaningful security indicators, both positive and negative; the avoidance of undesirable habituation and information overload; the use of messaging that draws a user's attention and provides guidance at a time and place of which the user is cognizant; an ability to take additional information into consideration at the time of content access; and many other additional benefits that will be evident to a person of ordinary skill in the art based on the present disclosure.

The above described aspects of the disclosure have been described with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a user may be provided direct access to a resource instance, e.g., by giving a user an administrator login and password. In other embodiments, the provider network operator may allow users to specify execution requirements for specified applications and schedule execution of the applications on behalf of the user on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 12:
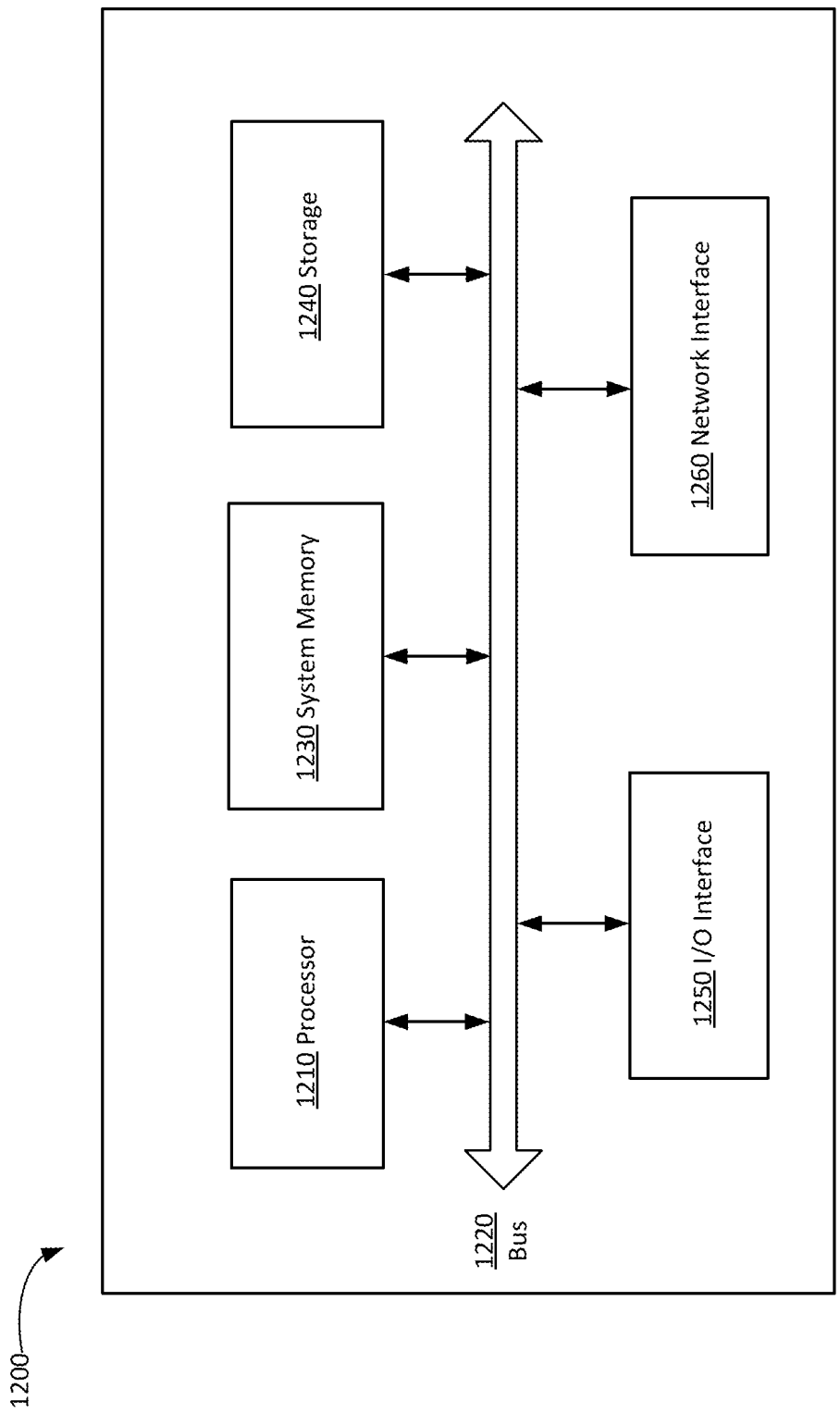
FIG. 12 is a schematic diagram illustrating an example computing device that may be used in accordance with the present disclosure.

In at least some embodiments, a server or computing device that implements a portion or all of one or more of the technologies described herein, including the techniques to implement the functionality of determining and presenting security status, may include a general-purpose computer system that includes or is configured to access one or more computer-accessible media. FIG. 12 illustrates such a general-purpose computing device 1200. In the illustrated embodiment, computing device 1200 includes one or more processors 1210 (which may be referred herein singularly as "a processor 1210" or in the plural as "the processors 1210") are coupled through a bus 1220 to a system memory 1230. Computing device 1200 further includes a permanent storage 1240, an input/output (I/O) interface 1250, and a network interface 1260.

In various embodiments, computing device 1200 may be a uniprocessor system including one processor 1210 or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1230 may be configured to store instructions and data accessible by processor(s) 1210. In various embodiments, system memory 1230 may be implemented using any suitable memory technology, such as static random access memory (SRAM), synchronous dynamic RAM (SDRAM), nonvolatile/Flash-type memory, or any other type of memory.

In one embodiment, I/O interface 1250 may be configured to coordinate I/O traffic between processor 1210, system memory 1230, and any peripheral devices in the device, including network interface 1260 or other peripheral interfaces. In some embodiments, I/O interface 1250 may perform any necessary protocol, timing, or other data transformations to convert data signals from one component (e.g., system memory 1230) into a format suitable for use by another component (e.g., processor 1210). In some embodiments, I/O interface 1250 may include support for devices attached through various types of peripheral buses, such as a variant of the Peripheral Component Interconnect (PCI) bus standard or the Universal Serial Bus (USB) standard, for example. In some embodiments, the function of I/O interface 1250 may be split into two or more separate components, such as a north bridge and a south bridge, for example. Also, in some embodiments some or all of the functionality of I/O interface 1250, such as an interface to system memory 1230, may be incorporated directly into processor 1210.

Network interface 1260 may be configured to allow data to be exchanged between computing device 1200 and other device or devices attached to a network or network(s), such as other computer systems or devices as illustrated in FIG. 1, for example. In various embodiments, network interface 1260 may support communication via any suitable wired or wireless general data networks, such as types of Ethernet networks, for example. Additionally, network interface 1260 may support communication via telecommunications/telephony networks such as analog voice networks or digital fiber communications networks, via storage area networks such as Fibre Channel SANs or via any other suitable type of network and/or protocol.

In some embodiments, system memory 1630 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 1200 via I/O interface 1250. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1200 as system memory 1230 or another type of memory.

Further, a computer-accessible medium may include transmission media or signals such as electrical, electromagnetic or digital signals, conveyed via a communication medium such as a network and/or a wireless link, such as may be implemented via network interface 1260. Portions or all of multiple computing devices may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might." "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method, comprising:
   collecting information associated with an item in response to user input;
   determining a security status associated with the item by classifying the item into one of a plurality of classifications based on the information associated with the item;
   presenting on a first interface information indicative of the security status, wherein the first interface further comprises at least one selectable interface element in relation to the information indicative of the security status, and wherein the information indicative of the security status comprises at least one of a warning or an endorsement associated with the item, and wherein the information indicative of the security status comprises text explaining at least one reason for the warning or the endorsement associated with the item; and
   performing an operation related to the item in response to receiving input indicative of a selection by a user of the at least one selectable interface element, wherein the operation related to the item comprises at least one of opening a file or website associated with the item or presenting additional information about the item.

2. The method of claim 1, further comprising:
   training a classification model using training data, wherein the classification model correlates at least one feature of at least one item with a classification of the at least one item.

3. The method of claim 2, further comprising:
   classifying the item into one of the plurality of classifications using the trained classification model.

4. The method of claim 1, wherein the first interface comprises information indicating that the item comprises a security risk.

5. The method of claim 4, further comprising:
   performing one or more security operations for managing the security risk associated with accessing the item or a resource associated with the item.

6. The method of claim 1, wherein the item comprises a Universal Resource Locator (URL).

7. The method of claim 1, further comprising:
   in response to receiving another user input on the item, performing another classification operation on the item.

8. The method of claim 1, further comprising:
   modifying an action performed by the user on the item for reducing a potential security risk associated with accessing the item or a resource associated with the item.

9. A system, comprising:
   at least one processor; and
   at least one memory communicatively coupled to the at least one processor to configure the at least one processor at least to:
   collect information associated with an item appearing in a file;
   determine a security status associated with the item by classifying the item into one of a plurality of classifications based on the information associated with the item;

present on a first interface information indicative of the security status, wherein the first interface further comprises at least one selectable interface element in relation to the information indicative of the security status, and wherein the information indicative of the security status comprises at least one of a warning or an endorsement associated with the item, and wherein the information indicative of the security status comprises text explaining at least one reason for the warning or the endorsement associated with the item; and perform an operation related to the item in response to receiving input indicative of a selection by a user of the at least one selectable interface element, wherein the operation related to the item comprises at least one of opening a file or website associated with the item or presenting additional information about the item.

10. The system of claim 9, wherein the information associated with the item is not visible in the file as presented to a user.

11. The system of claim 9, wherein the file is one of an email, a message, a document, or a webpage.

12. The system of claim 9, the at least one processor further configuring the at least one processor to:
train a classification model using training data, wherein the classification model correlates at least one feature of at least one item with a classification of the at least one item.

13. The system of claim 12, the at least one processor further configuring the at least one processor to:
classify the item into one of the plurality of classifications using the trained classification model.

14. The system of claim 9, the at least one processor further configuring the at least one processor to:
generate an indicator corresponding to the item; and
store the indicator and a classification corresponding to the item.

15. The system of claim 9, wherein the first interface comprises information indicating that the item comprises a security risk.

16. The system of claim 15, the at least one processor further configuring the at least one processor to:
perform one or more security operations for managing the security risk associated with accessing the item or a resource associated with the item.

17. A non-transitory computer-readable storage medium, storing computer-readable instructions that upon execution on a computing device cause the computing device at least to:
collect information associated with an item in response to user input;
determine a security status associated with the item by classifying the item into one of a plurality of classifications based on the information associated with the item;
present on a first interface information indicative of the security status, wherein the first interface further comprises at least one selectable interface element in relation to the information indicative of the security status, and wherein the information indicative of the security status comprises at least one of a warning or an endorsement associated with the item, and wherein the information indicative of the security status comprises text explaining at least one reason for the warning or the endorsement associated with the item; and
perform an operation related to the item in response to receiving input indicative of a selection by a user of the at least one selectable interface element, wherein the operation related to the item comprises at least one of opening a file or website associated with the item or presenting additional information about the item.

18. The non-transitory computer-readable storage medium of claim 17, further storing computer-readable instructions that upon execution on the computing device cause the computing device to:
determine content or formality of the first interface based on a type of the item, a classification of the item, and the information associated with the item.

19. The non-transitory computer-readable storage medium of claim 17, wherein the first interface comprises information indicating that the item comprises a security risk.

20. The non-transitory computer-readable storage medium of claim 19, further storing computer-readable instructions that upon execution on the computing device cause the computing device to:
perform one or more security operations for managing the security risk associated with accessing the item or a resource associated with the item.

* * * * *